Jan. 12, 1943.     R. MATTEUCCI     2,308,228
AIR PROPELLER WITH ADJUSTABLE PITCH DURING FLIGHT
Filed Aug. 20, 1937     5 Sheets-Sheet 1

Inventor,
R. Matteucci
by Glascock Downing & Seebold
Attys.

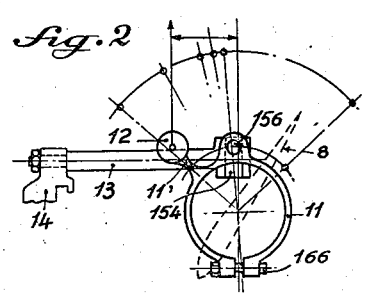
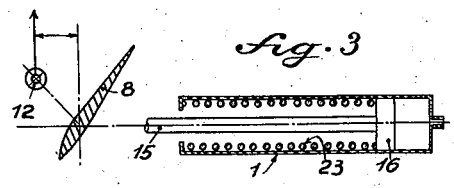
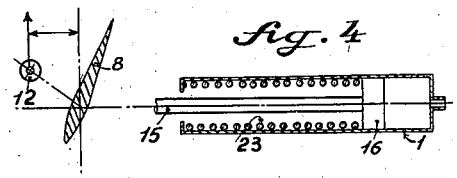
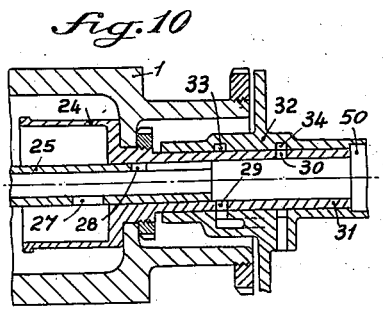
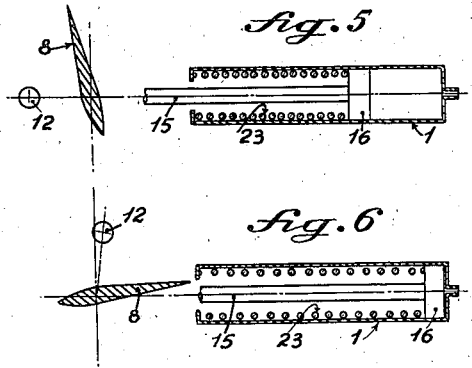
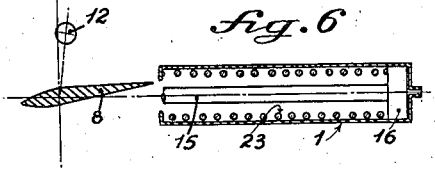
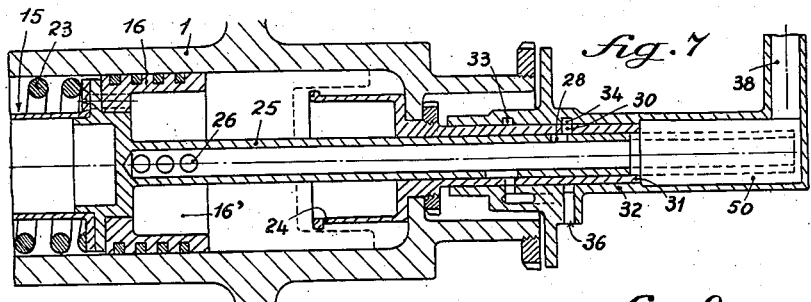
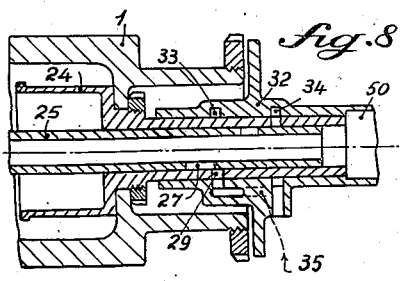
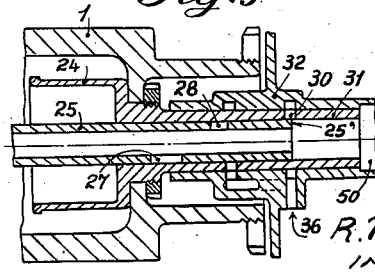

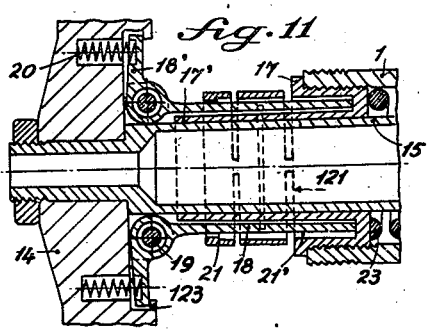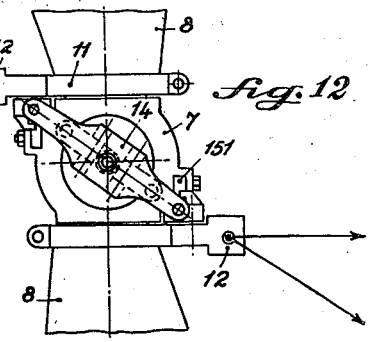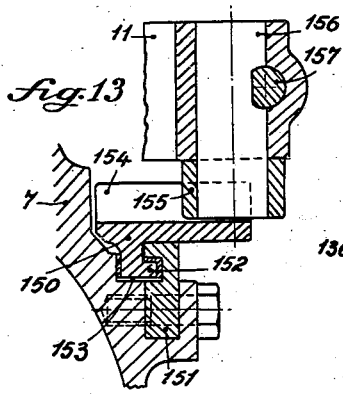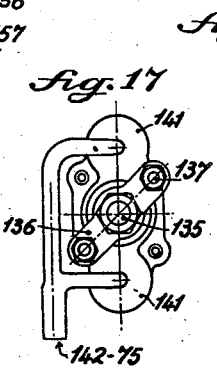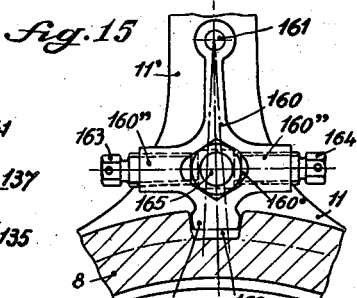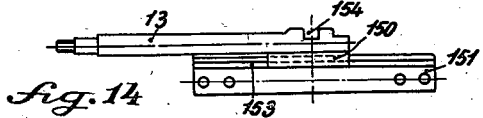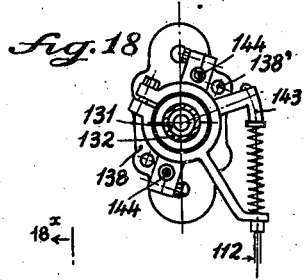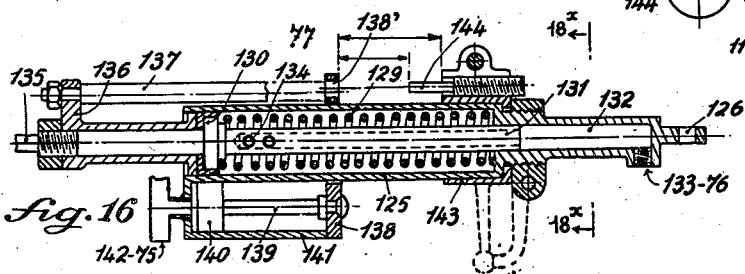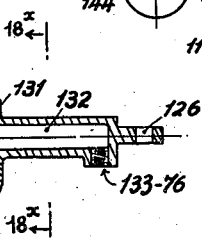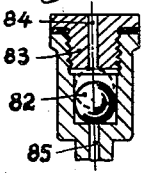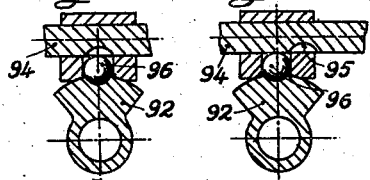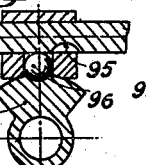

Jan. 12, 1943. R. MATTEUCCI 2,308,228
AIR PROPELLER WITH ADJUSTABLE PITCH DURING FLIGHT
Filed Aug. 20, 1937 5 Sheets-Sheet 4
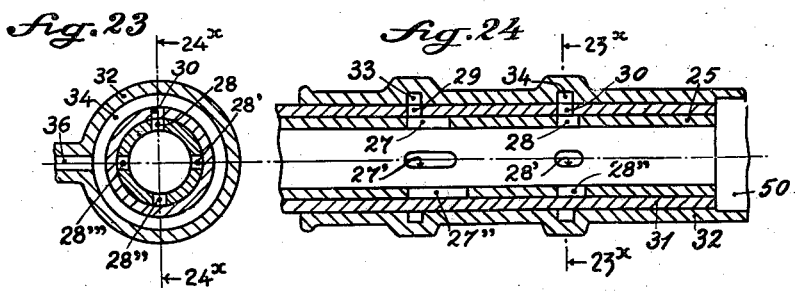
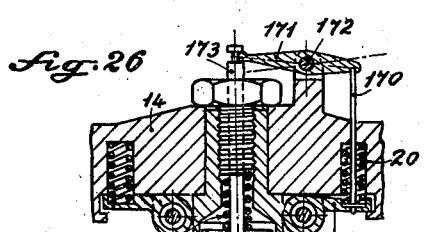
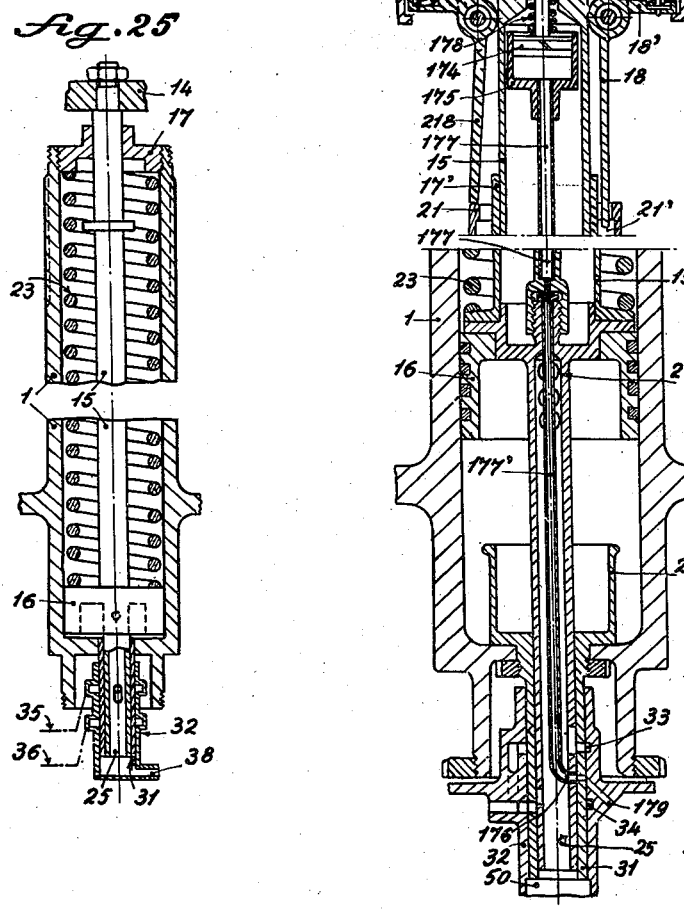
R. Matteucci
Inventor Jan. 12, 1943.   R. MATTEUCCI   2,308,228
AIR PROPELLER WITH ADJUSTABLE PITCH DURING FLIGHT
Filed Aug. 20, 1937   5 Sheets-Sheet 5
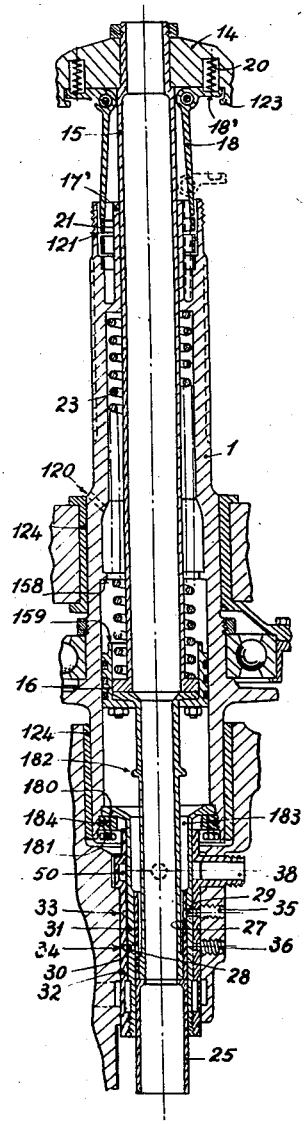
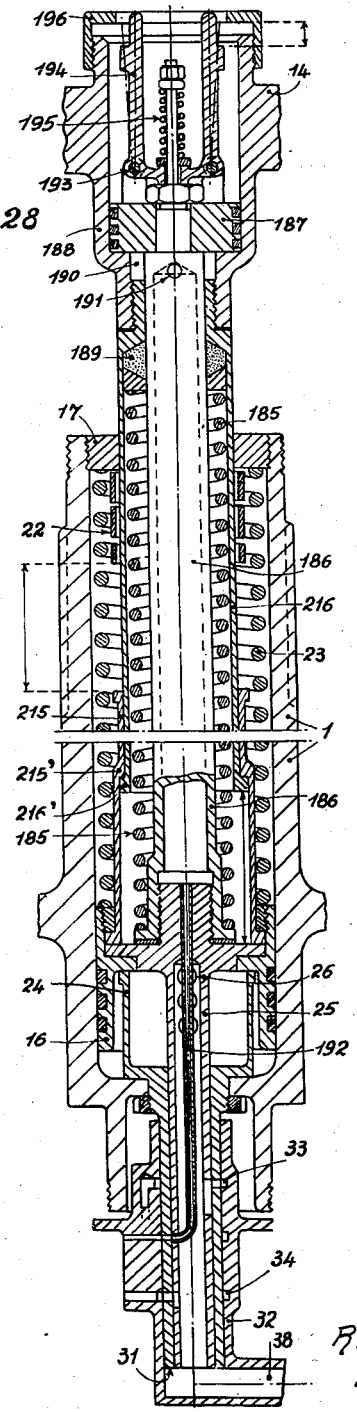
R. Matteucci
INVENTOR Patented Jan. 12, 1943

2,308,228

UNITED STATES PATENT OFFICE 2,308,228

AIR PROPELLER WITH ADJUSTABLE PITCH DURING FLIGHT

Raffaele Matteucci, Turin, Italy; vested in the Alien Property Custodian

Application August 20, 1937, Serial No. 160,170 In Italy August 31, 1936

17 Claims. (Cl. 170—135.6)

The present invention relates to a propeller, the pitch of which can be varied during flight and which is more particularly intended for use in aviation, the propeller being such that it is possible to effect the variation in pitch under such conditions as to obtain at will any one of a number of fixed pitches, and in addition, if desired, an infinite series of pitches between two fixed extreme propulsion pitches, and also a certain number of auxiliary pitches capable of being utilised under special conditions of operation of the aircraft.

In the propeller according to the present invention the control of the pitch of the blades is effected by the aid of fluid under pressure, the action of which is controlled by the pilot, if desired with the assistance if desired of an automatic regulator controlling the variation of the pitches in the field of the pitches used for the propulsion and which, for the intermediate pitches between those determined by mechanical stops maintains the blades in conditions of equilibrium in the different desired positions in opposition to a return member which tends to bring the blades to a determined pitch used normally for the propulsion.

Certain pitches, which due to the effect they exert upon the operation of the aircraft, must be used only under certain conditions or in certain predetermined relationship with the operating conditions of the engine driving the propeller, are made dependent upon a particular control which in its turn is connected to suitable safety devices, with a view to preventing accidental or dangerous manœuvres.

Some embodiments of the present invention are illustrated by way of example in the accompanying drawings.

Figure 2 is a diagrammatic plan view of the root of a blade with its actuating device, and gives an indication of the various pitches that can be obtained.

Figures 3, 4, 5 and 6 illustrate diagrammatically the relative conditions of a propeller blade, of the balancing counterweight and of the controlling device under different pitch conditions.

Figures 7, 8, 9 and 10 illustrate in part section and on a larger scale the controlling distributor under various operating conditions Figure 11 is an enlarged sectional view of a part of Fig. 1 showing a pawl device applied to the blade actuating member with the object of maintaining it in a fixed position.

Figures 12, 13 and 14 illustrate in elevation, in part section and in detail, an assembly arrangement of the members actuating a propeller blade.

Figure 15 illustrates diagrammatically an arrangement for regulating the angular position of a blade relative to its actuating member.

Figure 16 illustrates in longitudinal section a controlling device adapted to act upon the conditions of operation of the carburettors of the engine and in general upon the supply of fuel to the engine, in a manner which is dependent upon the conditions of operation in which the propeller has been placed.

Figures 17 and 18 illustrate respectively a view from the left hand end and a cross section on the line $18x$—$18x$ in Figure 16.

Figure 19 is a section of an automatic discharge vent employed in the air control piping.

Figures 20, 21 and 22 illustrate a device for obtaining a reciprocal locking action between a control for the propeller and the control for the carburettors or for the supply of fuel to the engine.

Figures 23 and 24 illustrate in section along the line $23x$—$23x$ in Figure 24 and along the line $24x$—$24x$ in Figure 23, an arrangement for regulating the control slide valve.

Figure 25 illustrates diagrammatically a simplified embodiment of the device for controlling the pitch of the propeller blades.

Figure 26 illustrates a type of propeller according to the invention, provided with another type of pawl device, adapted to secure the propeller in various pitch positions.

Figure 27 illustrates the propeller according to the invention, constructed in such a manner as to permit firearms to be fired through the propeller shaft.

Figure 28 illustrates another embodiment of the propeller.

Figure 1:
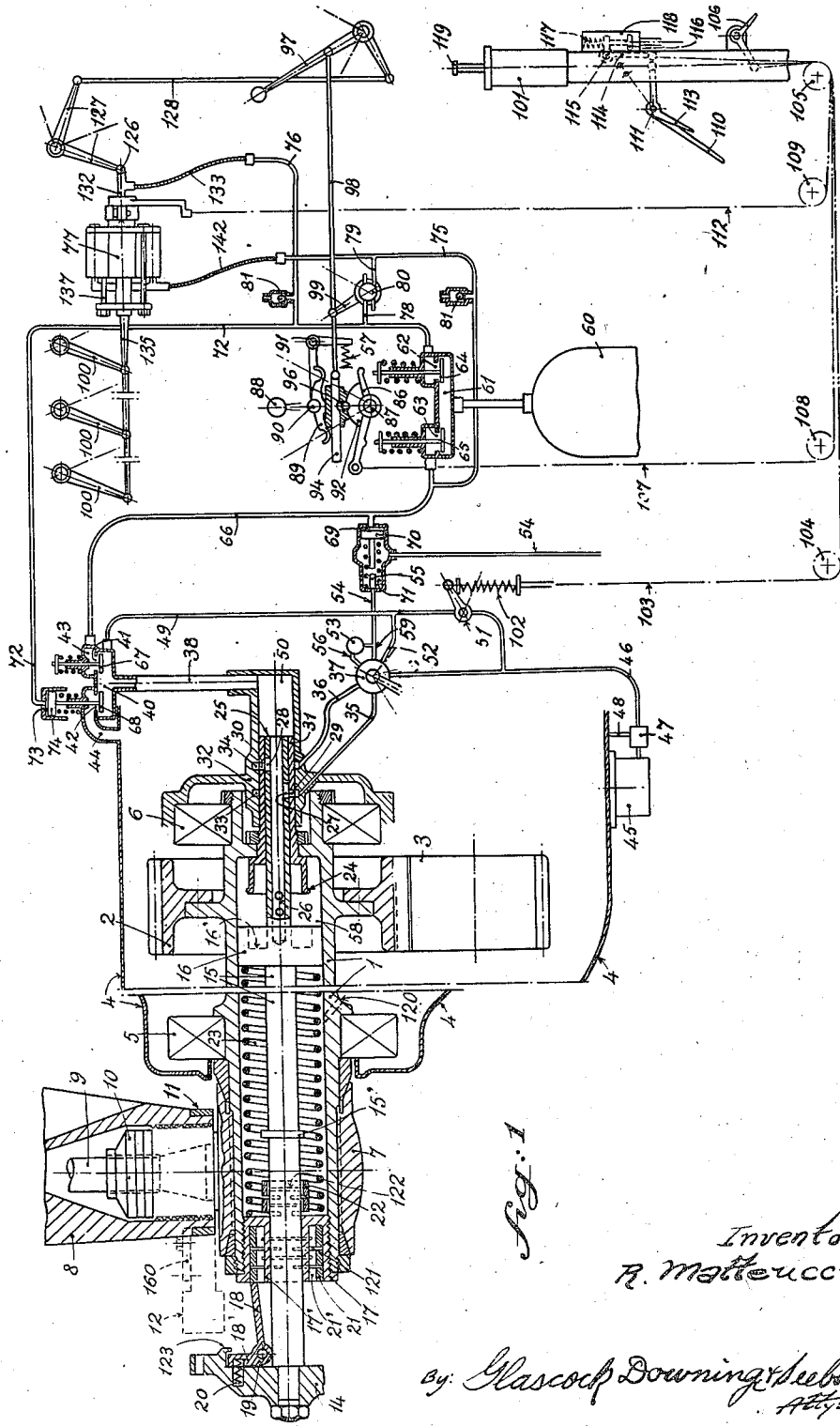
Figure 1 represents in diagrammatic cross section the propeller shaft with the root of a blade and the pitch varying device which in the case illustrated is placed in the propeller shaft, in combination with a number of controlling safety devices.

With the propeller according to the present invention it is possible to obtain a plurality of conditions of pitch. The various pitch arrangements are as follows:

Three or more fixed propeller pitches and in particular a high pitch, a mean pitch and a low pitch, and if desired intermediate pitches between the fixed pitches.

Reversal of the pitch combined with the automatic opening of the fuel to the engine which drives the propeller for the purpose of exerting a braking of the plane. This opening is effected in a fixed degree for obtaining the normal braking, or in another fixed degree for obtaining the emergency braking, according to the will of the pilot.

Infinite pitch, so that during flight with the engine free, the blades of the propeller can be disposed with their edge in the direction of the wind caused by flight in order to reduce the resistance offered by the propeller to the forward motion of the aircraft. Before effecting this pitch it is preferable to stop the rotation of the propeller caused by the wind of the flight, by means of a reversal of the pitch of the blades.

A so-called "warming-up" pitch, which permits the engine to be warmed up on land before taking off, by preventing the wind of the propeller from cooling the engine.

In the embodiment illustrated in Figure 1, the numeral 1 designates the propeller shaft, which is hollow and is driven by the engine by means of a reduction gear formed by a pair of gear wheels indicated diagrammatically at 2, 3. The shaft 1 is supported in the casing 4 of the reduction gear by means of the bearings 5 and 6, while upon the part of the shaft which projects from the casing 4 there is mounted the hub 7 upon which the variable pitch propeller blades are mounted, one of these blades being indicated at 8.

This assembly is effected for example by means of a radial pivot 9, rigid with the hub 7 and by means of suitable bearings 10.

Each blade is rigid with a collar 11 adapted to be adjusted angularly and provided with a centrifugal mass 12 adapted to balance the centrifugal and aerodynamic actions operating upon the same blade and which tend to modify its pitch. This collar is controlled as described hereinafter by means of a rod 13 and a cross member 14, by the rod 15 of a piston 16 slidably mounted in the hollow shaft 1 constituting the control cylinder.

The outer end of the hollow propeller shaft is closed by the cover 17 having an annular cavity opening towards its outer face traversed by the rod 15 of the piston 16 which is guided by the sleeve 17'. Upon the side of the cross member 14 directed towards the head of the shaft 1 pawls 18 are arranged. Each of these pawls is rotatably mounted at 19 by anti-friction means and is provided with an arm 18' subjected to the action of a compression spring 20 arranged in a cavity of the cross member 14. The main arm of the pawl 18 is adapted to abut against an annular member 21 arranged in the cavity in the cover 17, or is adapted to penetrate into the annular cavity 21' of the same member according to the conditions of operation as described hereinafter. This annular member possesses a certain elasticity on account of the provision of cuts 121 formed therein so as to deaden the impact upon the application of the pawls.

The rod 15 of the piston 16 has a shoulder 15' adapted to abut against a collar 22 which is rendered moderately elastic by means of cuts 122 and which is fixed to the cover 17 and serves to deaden the stopping impact of the rod. The rod 15 is surrounded by the spring 23 which constitutes the member for returning the blades and which acts upon the piston 16 by bearing against the cover 17. The piston 16 upon the face which is opposite that upon which the spring 23 bears is provided with a cavity 16' adapted to engage with clearance upon a fixed annular member 24 so as to form, when the piston 16 returns to the end of its right-hand travel, a sinuous passage which throttles the flow of the fluid and deadens the stopping motion of the piston 16 and of the members connected thereto.

The piston 16 is prolonged by a tubular slide valve 25 provided with ports 26 in proximity to the piston and with parts 27, 28 formed at suitable points near its open end. These ports 27, 28 are adapted to correspond respectively with the holes 29, 30 in a sleeve 31 fixed upon the shaft 1 and within which the slide valve 25 moves. The sleeve 31 turns with easy friction in a packing support 32 fixed to the casing 4 and in which are formed grooves 33, 34 which correspond respectively with the holes 29, 30 and to which lead the tubes 35, 36 coming from a control distributor 37 which is adapted to cause the fluid under pressure to act in the desired manner.

The extremity of the hollow fixed support 32 is connected by means of the tube 38 with a chamber 40 provided with two ports 41, 42 which communicate respectively with a chamber 43 and with a duct 44 leading into the casing 4 and which constitute the seat of the valves 67, 68 described hereinafter.

The control distributor 37 receives the fluid under pressure from a supply pump 45 driven by the engine. In general engine lubricating oil is utilised by drawing it preferably from the duct which delivers it under pressure and by discharging it into the casing 4 or into the oil reservoir. A safety valve 47 is arranged in the tube 46 which connects the pump 45 with the control distributor 37. This valve is set at a predetermined pressure and discharges the fluid into the casing 4 through the tube 48.

A tube 49 leads from the tube 46 and communicates directly with the chamber 40 and consequently with the tube 38 and with the chamber 50 formed by the support 32, while a control valve 51 is inserted in the tube 49 and is actuated in the manner described hereinafter. The tube 49 is connected to the distributor 37 by means of the tube 52.

The chambers 50 and 58 of the cylinder 1 are connected by means of the tubes 49 and 52 with the distributor 37 by means of which they can be put into communication with a discharge tube 54 leading into the casing 4 or into the oil reservoir, this being done according to the different combinations either directly by means of the tube 59 or by means of a discharge valve 53 through the tube 56.

The tube 49 may also be placed in direct communication with the pump 45 by means of the valve 51 which is normally closed.

A stop valve 55 is arranged in the tube 54 on the downstream side of the valve 53 and is controlled in the manner described hereinafter.

In combination with the control system described which employs liquid under pressure use is made of another control system which employs an auxiliary fluid, in particular compressed air or gas, this second control system being designed for obtaining rapid variations in pitch under the required conditions of safety. When the auxiliary fluid is compressed air the system may advantageously be supplied from a tank 60 which may be formed by the compressed air tank or other reservoir which is already provided for other purposes on the aircraft. To the tank 60 is connected the chamber 61 the orifices 62, 63 of which constitute the seat for the valves 64 and 65.

The tube 66 leads off from the downstream side of the valve 65 and delivers to the upstream side of the automatic valve 67 of the chamber 43 while a cylinder 69 is branched on the tube 66, the piston 70 of this cylinder being subjected to the action of a return spring 71 and controlling the stop valve 55 of the discharge duct 54. The tube 72 leads away from the downstream side of the valve 64 and delivers into a small cylinder 73, the piston 74 of which controls the valve 68 against the action of its return spring.

The tube 75 also leads from the tube 66 and communicates through a flexible tube 142 with a device 77 which will be hereinafter described and which is intended to modify the conditions of openings of the carburettors of the engine or the fuel pumps, while the tube 76 leads from the tube 72 and is also connected through the flexible tube 133 to the same device 77. The two tubes 72 and 75 are connected at 78 and 79 to a valve 80 discharging to the atmosphere and controlled in the manner described hereinafter.

Upon the tubes 75 and 76 are branched automatic vents 81 of the type illustrated in Fig. 19 and comprising a ball 82 arranged with slight clearance in a chamber closed at the upper part by a plug 83 provided with a hole 84 opening to the atmosphere.

The ball 82 permits any small quantities of air to escape to the atmosphere which under normal conditions reach the vent on account of leakages through the hole 85 communicating respectively with the tube 75 or 76 so that when a high pressure is set up in the duct 85 the ball is thrown against the plug 83 and closes the hole 84 thus shutting off the hole 85 and the tube to which it is connected from the atmosphere.

The valves 65 and 64 are controlled by means of a rocking lever 86 pivoting at 87 and actuated by means of the lever 88 which is provided with a member 89 co-operating with the pawl stop 90 pivoting at 91 and actuated by the spring 57 in order to separate the three positions which the rocking lever 86 can adopt as described hereinafter. The rocking lever 86 is acted upon by a locking device of known type comprising as shown in Figs. 1 and 20, 21, 22 a quadrant 92 rigid with the rocking lever 86 and provided with a notch 93, a bolt 94 provided with a notch 95, and an intermediate ball 96. This ball permits the movement of the quadrant when the notch 95 in the bolt 94 is situated opposite to it, and on the contrary locks the sector when the bolt is moved away from the above mentioned position. This same ball permits the movement of the bolt 94 when the notch 93 in the quadrant 92 is situated opposite the ball and prevents this movement when the quadrant 92 is moved away from said position. The bolt 94 is connected to the lever 97 which controls the supply of fuel to the engine by means of the rod 98 which also acts upon the arms 99 of the valve 80 which discharges to the atmosphere.

The control of the fuel supply or of the fuel pumps by the lever 97 is effected by means of the device indicated diagrammatically at 77 in Fig. 1 and described hereinafter with reference to Figs. 16, 17 and 18, which device permits the levers 100 controlling the supply of fuel to be acted upon independently of the normal control lever 97 and while the latter is locked.

According to the conditions in which the control member is situated this device permits the supply of fuel to be effected in accordance with different pre-established conditions as described hereinafter.

The actuation of the valve 51, the rocking lever 86 and the device 77 adapted to act upon the levers 100 which control the supply of fuel, is preferably effected by means of auxiliary control members fitted upon the lever 101 which controls the aircraft or upon an equivalent member. For this purpose the valve 51 is controlled against the action of the closing spring 102 by the cable 103 which passes over the pulleys 104, 105 and is connected to a lever 106 mounted at the base of the control lever 101.

In a similar manner the rocking lever 86 is connected by means of the cable 107 which passes over the pulleys 108 and 105, to the flight lever 110 which is pivotally mounted at 111 upon the control lever 101; and finally the cable 112 which acts upon the device 77 in the manner described hereinafter and which passes over the pulleys 109 and 105, is connected to a lever 113 placed at the side of the lever 110 also pivoting at 111. The two levers 110, 113 are of different lengths so that it is possible to operate the lever 110, which is the longer, without actuating the other lever while by gripping them both near the pivot 111 the two levers 110, 113 can be actuated simultaneously by a single operation.

The lever 110 is provided with a safety locking device which operates in combination with the device controlling the brakes of the wheels of the landing carriage of the aircraft. This locking device is formed by a pawl 114 pivoted at 115 upon the control rod and subjected to the action of the piston 116 provided with a return spring 117 and the cylinder 118 which is connected to a compressed air duct (not shown) which leads to the wheel brakes of the carriage. By means of this arrangement when the brakes are actuated the piston 116 is raised and the pawl 114, by turning in an anti-clockwise direction about its own pivot 115, disengages the lever 110.

The control distributor 37 is formed by a multi-way distributor of suitable type which permits the various necessary connections to be established at will between the oil supply (tube 46), the tubes 35 and 36 which lead to the grooves 33 and 34, the tubes 59 and 56 which by means of the tube 54 return the oil to the casing 4 or to the reservoir, the first directly and the second through the discharge valve 53, and the tubes 52, 49 which communicate with the chamber 50.

The safety valve 47 of the pump 45 is set in such a manner as to maintain a pressure slightly greater than that of the air in the tank 60. On the other hand, the discharge valve 53 is set for a pressure which is slightly greater than that which it is necessary in the chamber 58 of the cylinder in order to maintain the collar 15' with certainty in contact with the elastic stop 22, this pressure being lower than that in the tank 60.

In the embodiment illustrated the propeller is adapted to have three normal propelling pitches (low, medium and high), zero pitch, infinite pitch (that is to say, with the median plane of the blade located in a plane which approximates the axis of rotation of the propeller), an auxiliary low pitch for taking off, and in addition an inverse pitch opposite to the preceding pitches. This inverse pitch may be employed for exerting an aero-dynamic braking action on the aircraft or for reversing its motion when moving on land, or as stated above for warming up the engine rapidly before taking off, and finally for stopping the rotation of the propeller due to the wind caused by the flight before setting it to the infinite pitch. In each of the different propelling pitch positions and in the infinite pitch position each propeller blade is substantially balanced about its own pivotal axis by the action of the mass 12.

This will be understood from Figs. 3, 4 and 6 which show the relative positions adopted by the centrifugal mass 12, the blade 8 and the parts of the device which actuate the blades in the above mentioned pitch positions, and this will also be seen in Fig. 12 in which the position of the masses 12 relative to the axis of rotation of the propeller is illustrated.

From these figures it will be understood that the action of the centrifugal force developed by the mass 12 upon each blade by means of its lever arm relative to the axis of pivotal movement of the blade compensates substantially the centrifugal force acting on the blade 8 and the aerodynamic stresses exerted upon the blade tending to turn the blade about its axis of pivotal movement.

It follows that a relatively weak action of the spring 23 or of the fluid acting on the piston 16 will be sufficient to produce the desired variations in pitch. In the conditions shown in Fig. 5 (inverse pitch) these aero-dynamic actions are, on the contrary, not quite compensated and these actions by adding to the action of the spring 23 facilitate the rapid return to the propelling pitch positions.

In Fig. 1 the blade is shown in the high "rest" pitch position which is the position it tends to adopt during flight in the case when the control device is not operative. The propeller is maintained in this position by the return spring 23 acting upon the piston 16 and by the pawls 18 which bear against the elastic member 21 mounted in the cylinder cover.

Under these conditions the control distributor 37 effects a connection between the tube 46 leading from the oil pump 45 and the two tubes 35 and 36. The oil thus fills the chamber 50 and the cavities communicating with the latter and through 38, 40, 49, 52, 37, 59 and 55, and discharged freely at 54 and returns to the casing 4 or to the oil reservoir.

In order to effect the mean pitch position the distributor 37 is moved into the position for which it establishes a connection between the tubes 46 and 36 while it closes the tubes 35, 52, and 59. The oil then passes through the groove 34, the hole 30 and the port 28 in the hollow slide valve 25, to reach the interior of the latter, and it leaves the hollow slide valve through the holes 26 so as to act in the chamber 58 of the cylinder 1. The piston 16 of this cylinder then moves towards the left against the action of the spring 23 until the displacement of the slide valve 25 which throttles the passage through the ports 28 and 30 reaches the point at which the oil which passes under pressure exactly compensates for the leakages which occur upon the packing rings of the piston 16 and between the parts of the slide. The first of these leakages pass into the front part of the cylinder and are discharged into the casing 4 through the hole 120. The second of these leakages are discharged directly into this casing.

In this way the device actuating the blades is placed in a position of equilibrium which corresponds to the desired pitch. This position is illustrated in Fig. 7.

The excess of oil delivered by the pump 45 is discharged from the distributor 37 through 56 to the discharge valve 53 and to the tube 54.

In order to change to the low pitch position the distributor 37 is placed in a condition to establish the connection of the tube 46 with the tube 35 and with the groove 33 and to operate the closure of 36, 52, and 59. An operation similar to that already described is then obtained and the blades reach the position of equilibrium which corresponds to the position of the slide valve in which the passage of the oil under pressure between the co-operating ports 27 and 29 is throttled to a degree such that the reduced section permits a quantity of oil to pass which compensates for leakages (Fig. 8). The excess of oil delivered by the pump is discharged from the distributor through 56, 53 and 54.

By providing in the slide valve 25 and in the sleeve 31 a number of pairs of ports and of co-operating holes such as 27, 29 and 28, 30, and also the relative connections with the supply 46 through the distributor 37, other pitches may be obtained.

The pitch may also be reversed with the object of obtaining the warming up pitch defined above by moving the distributor 37 into the position for which it closes the tube 35 and establishes the communication of the tube 46 with the tubes 52, 49 and 38 and of the tube 36 by means of the tube 56 with the discharge valve 53 through which the excess of oil is discharged through 54.

The "zero" pitch may be obtained starting from the warming up pitch by establishing a direct discharge of oil from the tube 36 to the tube 54. The piston 16 and the slide valve 25 then recoil until the free edge 25' of the slide valve (Fig. 9) becomes situated approximately opposite the edge of the hole 30. The desired pitch is then established and is maintained by the oil supplied continuously through the tube 38.

In order to obtain an infinite pitch, assuming that the propeller shaft is at rest and that the pawls 18 are consequently not subjected to the action of centrifugal force, fluid under pressure may be injected momentarily into the cylinder so as to separate the pawls 18 from the annular member 21. The pawls 18 under the action of their springs 20 then move towards the axis until they abut against the stop 123 and are thus in a condition to re-enter the annular recess 21' of the member 21 when the displacement to the right of the piston 16 under the action of the return spring 23 (Fig. 11) has been completed.

During the latter part of the travel effected under the action of the spring 23, the motion is damped as a result of the throttling to which the liquid is subjected inside of the sinuous passage formed by the bell 24 over which fits, with a certain amount of play, the cavity 16' of the piston (Fig. 7, dotted line).

A specially advantageous manner of bringing the infinite pitch into operation will be hereinafter described.

The taking off pitch may be obtained, when the low pitch has already been put in operation, by opening the valve 51 through the actuation of the lever 106. The oil under pressure then passes, through the tubes 46, 49, directly into the chamber 50, thus producing the desired slight displacement to the left of the piston 16 and of the rod 15. After the valve 51 is closed, the normal pitch is reestablished as a result of the leakages through which the oil thus introduced leaves the cylinder.

The conditions of aerodynamic braking of the aeroplane, which braking may be of use in cases of difficult landing and under other conditions of flight, are, preferably, obtained with the aid of a control system operated by an auxiliary fluid, which may be assumed to consist of compressed air, with a view to obtaining an extremely rapid actuation which would not be easy to obtain with the liquid control already described. Instead of compressed air any other fluid pressure may be used provided the particular valve gear that operates the distribution rapidly exhausts the fluid into the chamber 58 of the cylinder.

To carry out this manipulation, the handle 88 is shifted and moved into a position to the left of the mean position. The valve 65 is then opened and a rapid current of air in the tube 66 causes the valve 67 to open. On reaching the chambers 50 and 58 the air rapidly moves the piston 16 to the extreme left so as to produce a reversal of pitch. At the same time the air acts on the piston 76 of the cylinder 69 and closes the valve 55 so as to cut off the discharge of oil from the cylinder 1.

The closing of the valve 55 causes an increase in pressure of the oil in the system fed by the pump 45 until it reaches the value for which the safety valve 47 has been adjusted or a value that is higher than that of the air supply.

The rise in oil pressure is transmitted into the chamber 50 through the tube 35 since the position of the slide valve leaves both of the ports 29, 30 uncovered (Figure 10). The oil then passes into the chamber 50 until the pressure reaches the adjusted value of the valve 47 with the result that immediately after the injection of air has been completed the valve 67 again closes.

Simultaneously with the operation described, the compressed air passes into the tube 75, closes the automatic vent 81 in the manner specified and actuates the device 77 which increases the feed of fuel necessary to raise the functioning conditions of the engine automatically to the predetermined degree and to ensure automatically that the braking attains the efficiency desired.

The equipment and arrangements are such that this automatic intensification of the functioning conditions of the engine is effected during the braking with a slight lead relatively to the moment in which the blades pass through the "zero" pitch, in such a manner as to obviate the propeller being stopped by the flight air-currents when the reversal of the pitch has been attained.

The manipulation of the brake-system may be effected by means of the handle 88 as already set forth; to facilitate the manipulation further, there is provided a secondary control fitted on the control flight lever 101 and comprising the levers 110, 113. By means of this control, the pilot while actuating the brakes of the carriage wheels in a known manner by means of the button 119 and thus also cutting out even the pawl 114, operates the lever 110 and causes the aerodynamic braking of the aeroplane.

In all cases the brake release is effected by means of handle 88, which is thrown over into the right hand position and; the valve 64 then opens and the air passes into the cylinder 73 giving rise to the displacement of the piston 74 and the opening of the valve 68, with the result that the compressed air, or, generally speaking, the auxiliary fluid collected in the axial section of the cylinder, discharges rapidly into the chamber 50 under the influence of the return spring 23 and the non-compensated aerodynamic forces exerted on the blades and passes into the casing 4 through the conduit 44. The handle 88 is then restored to its normal position.

The stoppage of the movable members of the blade-actuating mechanism in their extreme positions is dampened during the rapid movement of braking and of brake release, by the resilient members 21, 22, on which bear respectively the pawls 18 and the collar 15' of the rod 15.

The braking manipulation described cannot be carried out prematurely, as, for instance, when the engine is running at a high speed, owing to the mutual-locking mechanism 92, 96, 94 between the handle 88 and the fuel-feed control. This is so, for the reason that the mechanism just described allows the handle 88 to be manipulated only when the feed control is in its position of slow operation or near this position; furthermore, this same mechanism does not permit the control of the carburettors or equivalent organs, to shift from this position so long as the handle 88 is outside of its mean inoperative position. A further security is offered by the valve 80, which is under the influence of the carburettor control in the sense that it permits the tubes 72, 75 to discharge into atmosphere when the carburettors or equivalent members are in normal working conditions, while it prevents this discharge and reestablishes the communications necessary for braking when the carburettors are under retarding conditions.

With the air control device described in the foregoing, the infinite pitch may also be obtained, that is to say, the blades may set approximately to the plane passing through the axis of rotation of the propeller. To this end when the propelling engine has ceased to function, a braking operation of the nature specified is carried out, so as to reduce to a standstill the propeller which, otherwise, might continue to rotate under the influence of flight currents, this being done by reversing the pitch and thereafter effecting the brake-release.

As soon as the propeller has stopped and the piston has regained its extreme left position in which the pawls 18 become disengaged from the member 21, these pawls being no longer subjected to the action of the centrifugal force come together again near the rotation axis of the propeller under the influence of the spring 20. When the brake release operation is then carried out, that is, when the chamber 50 is put in condition to discharge through the conduit 44, the pawls 18 penetrate into the recess 21' (Fig. 11) and allow the rod 15 to regain the extreme right point in its travel; its stoppage is damped by the throttling of the current of oil, in the manner already set forth.

The means intended to establish the fuel feed conditions necessary for the two degrees of aerodynamic braking may be of any suitable type whatever. As illustrated in the forms of practical construction shown in Figs. 16, 17 and 18, the means comprise a cylinder 125, the tubular head 132 of which is connected at 126 to the bell-crank lever 127 (Fig. 1) actuated by means of the rod 128 connected to the handle 97 of the carburettor control. Within the cylinder 125 a piston 130 is arranged to slide against the influence of a spring 129 the hollow rod 131 of which slides within the head 132, while its hollow interior communicates through the flexible tube 133 with the tube 76 while the apertures 134 in the rod 131 establish communication with the interior of the cylinder 125. The piston 130 is prolonged on the outside of the cylinder 125 by means of the rod 135, which is connected to the levers 100 for the control of the fuel feed and is provided with a cross-piece 136, to which are secured two rods 137 parallel to the cylinder 125 and, in their turn, secured to a collar 138 sliding on the cylinder 125. To the collar 138 are secured the rods 139 of the two pistons 140 arranged within the cylinders 141 which are externally mounted on the cylinder 125 in diametrically opposite positions and connected to the tube 75 by the flexible tube 142.

Upon the cylinder 125 is mounted in a freely rotatable manner a sleeve 143 connected to the cable 112 and provided with a pair of rods 144 against which can bear the collar 138, while the latter has also a pair of apertures 138', which allow the rods 144 to pass therethrough when the sleeve 143 that carries them is in a certain angular position.

When the air is pressing within the tube 75—142 and in the cylinders 141, the pistons 140 move to the right, against the action of the spring 129, the rods 139, the collar 138 and the rod 135 with piston 130, while the cylinder 125 remains motionless since it is secured to the handle 97 which is locked by the system 92, 96, 94. Thus the displacement of the levers 100 is effected in a manner corresponding to the travel accomplished by the collar 138, which travel in turn depends on the angular position of the rods 144 and consequently on whether or not the lever 113 has been manipulated. In the latter case, the collar 138 and the rod 135 are stopped as soon as the collar 138 meets the rods 144 while in the former case they are finally displaced, in consequence of the free passage of the collar 138, over the rods 144, which are in positions opposite the apertures 138' until the collar 138 meets the sleeve 143.

When the conduit 142—75 is put in communication with the exhaust and the compressed air passes into the tubes 76, 133, the rod 135 rapidly resumes its original position under the influence of the spring 129 and of the air which acts, in cooperation with the spring 129, on the piston 130 of the cylinder 125 through 132, 131, 134.

In Figs. 23 and 24 is shown a system which permits the adjustment of the relative conditions of the ports of the slide valve 25 and of the sleeve 31 with which it cooperates and, in consequence, the positions which may be imparted to the piston 16 and to the blades.

In this case, the slide valve 25 is provided, opposite each of the apertures 29, 30 which communicate with the corresponding feed groove 33, 34, with several ports 27, 27', 27'', 27''', 28, 28', 28'', 28''', having different lengths measured in the axial direction and distributed over the periphery of the slide valve. By mounting the slide valve in various angular positions relative to the sleeve 31, one or other of the ports 27 ... 28 ... may be adjusted so as to cooperate with the apertures 29, 30 of the sleeve 31. This is rendered easier by the general arrangement by virtue of which the piston can be drawn off along with the slide valve 25 of the front part of the propeller by dismantling a minimum number of parts and without it being necessary to disturb the reduction gear that actuates the propeller.

In Figs. 12–14 is illustrated a preferred form of the connection between each collar 11 secured to a propeller blade and the cross-piece 14 intended to control them.

This connection is operated, for each blade, with the aid of the rod 13, which with its guide 150 slides on the lateral slipper-block 151 secured on the boss 7 of the propeller and on which it engages, by means of a lug 152, in a longitudinal groove 153 so as to withstand the centrifugal forces. The guide member 150 has a transverse recess 154, in which works a roller 155 idly mounted on the pin 156 fixed to the collar 11 by means of the cotter 157.

The exact angular adjustment of the blade 8 relative to the collar 11 may be achieved with the aid of the device shown in Fig. 15, which comprises a lever 160 pivoting at 161 on the arm 11' of the collar and the extremity 160' of which engages with precision in the groove 162 of the foot of the blade 8. Two bolts 163, 164 screwed into the lateral lugs 160'' of the lever 160, act on a rod 165 fixed to the arm 11' and pass through a port-hole 160° in the lever 160. It is obvious that by simultaneously acting on the two bolts 163, 164, the lever 160 may be swung about is pivot 161 and consequently the blade may be angularly displaced relatively to the collar 11, in which the foot of the blade is thus locked with the aid of the bolt 166 shown in Fig. 2.

In Fig. 25 is diagrammatically illustrated a more simple form of construction of the propeller described above with the propeller shaft 1 forming the cylinder, the piston 16, controls the cross-piece 14 that acts on the blades and the distribution system comprising the slide valve 25, the sleeve 31 and the stationary element 32 constituting the chamber 50. With this form of construction it is possible to obtain, by means of the manipulations already described, the various pitches previously specified with the exception of the infinite pitch.

With the propeller described it is possible to obtain, during flight, a pitch higher than the high normal which is produced when the pawls 18 abut against the annular member 21. This pitch may be of advantage in the event of prolonged flights at high altitudes.

For this purpose, recourse is had to two groups of stop pawls, of the type of the pawls 18 in Figure 1. The pawls of each group have different lengths and are so arranged that it is possible, during flight, to cut out the longest pawls.

A system of this type is shown in Figure 26, in which the pawls 18 correspond to those described above and establish the high normal pitch. In a manner similar to that of the pawls 18, the pawls 218 are mounted. The arm intended to bear on the rest-member 21 is shorter so that when the pawls 218 are operated to stop the rod 15 and the whole system of blade control against the action of the return spring 23, the blades take up a position corresponding to a pitch higher than the normal pitch.

The pawls 18, which correspond to the high normal pitch, are equipped with a device which permits their being cut out as desired. To this end, there acts on the arm 18', which is influenced by the spring 20, a rod 170 actuated by a rocking-lever 171 pivoted at 172 on the cross-piece 14 and controlled by a rod 173 that is driven by the piston 174 of a small cylinder 175 mounted on the extremity of the rod 15. When oil under pressure is made to pass into the interior of the cylinder 175 through the tube 177, the rocking lever 171 is made to oscillate and the pawls 18 are driven into their innermost position and under conditions enabling them to re-enter the recess 21'. The pawls 18 thus remain cut out while the shorter pawls 218 continue to be operative and, as they bear against the member 21, maintain the blades in the position of the auxiliary high pitch.

In order to carry out this manipulation, it is, of course, necessary to separate the pawls 18 from the member 21 and the propeller is brought into the condition of mean pitch prior to carrying out the manipulation described. With this object in view, it is preferable that the tube 177', which discharges into the cylinder 175 and which is secured to the rod 15 and to the slide valve 25, should communicate with the feed of the fluid through an aperture 176 of the slide valve 25, which will assume a position opposite the feed aperture when the slide also is in the position of mean pitch. It is, in this case, assumed that the feed of the fluid is derived from a source other than the pump 45 and that it is controlled by the distributor 37.

In order to establish the high pitch for great altitudes, the distributor 37 is then adjusted into the position of mean pitch, the oil under pressure is fed into the cylinder 175 and the distributor 37 is thereafter adjusted into the high pitch position. The blades thus take up the position of high pitch for great heights, since the stoppage is effected by the shorter pawls which are always subjected to the action of the centrifugal force, instead of by the longer ones 18, which have been put out of action in opposition to the centrifugal force by the manner of functioning just described.

For the purpose of reverting to the position of high normal pitch, the distributor 37 is restored to the position of mean pitch, with the result that the pawls 18 return to their normal position under the influence of the centrifugal force. This is possible since the pawls 18 are no longer subjected to the action of the oil in the cylinder 175, since the feed of oil into this cylinder takes place merely for an instant during the manipulation described and immediately thereafter, the pressure in the cylinder 175 is relieved owing to leakages and under the action of the spring 178 influencing the piston 174. The distributor 37 is then adjusted to the position of high pitch in which the members are stopped by the longer pawls 18, which again abut against the rest-piece 21.

In Fig. 27 is shown a constructional form of the propeller described and adapted to permit firing a weapon through the propeller shaft. In this form of construction, the structural arrangement and the operation are similar to those already described and the various members are indicated by the same reference numerals. The rod 15 of the piston and the slide valve 25 are tubular and the members 31 and 32 are so shaped as to permit the slide valve, without in any degree sacrificing the requisite fluid tightness, being elongated towards the rear part and emerging from the casing towards the muzzle of the firearm.

In the case of propellers mounted directly on the crank-shaft of the engine or also on the driven shaft of coaxial reduction gear, the whole of the propeller shaft passes through the stationary sleeve 32 which ensures fluid tightness and with which it cooperates to establish by means of radial apertures, the various communications with the interior of the cylinder and with the distribution slide valve 25 that reciprocates within the sleeve 31 mounted in the axial cavity of the shaft. The assembly thus constituted gives substantially the arrangement illustrated in Fig. 7 and with the operating conditions previously described, are reproduced. The section of the shaft 1, projecting beyond the sleeve 32 towards the engine, carries the cranks or is connected with them or else is connected with the driven member of the coaxial reduction gear.

In the constructional form shown in Fig. 27 the cylinder is open on the side opposite the boss of the propeller and the dismantling of the internal elements is carried out from this side, by removing the cover 180, which is integral with the sleeve 31 in which slides, in a leakage-proof manner, the slide valve 25. This cover is secured by a circle of screws 181 parallel to the axis of the propeller, screwed into the ring 184, which is threaded into an extension of the cylinder. This form of construction for the cylinder is advantageous inasmuch as it allows it to be given a diameter greater than would be permitted by the diameter of the recess by which the propeller boss is incorporated on to the shaft; the manner in which the cover is fixed into the cylinder does not enlarge its outer diameter and renders it easier to mount the shaft onto the plain bearings 124, which are particularly preferable in this application by reason of their limited radial size. The collar 182 cooperates with the recess 183 to form a labyrinth intended to deaden the end of the return stroke of the piston 16 under the action of the spring 23.

The limitation of the left hand stroke of rod 15 for the purpose of reversing the pitch is effected by the collar 158 provided inside the cylinder as a rest for the piston 16; the collar 159 of this latter cooperates with the collar 158 to form a labyrinth in which the oil that escapes from the piston 16 deadens the shock at the moment of contact.

In Fig. 28 is illustrated a constructional form of the propeller in which the displacement of the cross member 14 for obtaining determined auxiliary pitches, such as the infinite pitch is effected by shortening temporarily the length of the piston rod.

In this form of construction, the tubular shaft 1, the piston 16, the return spring 23 and the slide valve 25 are constituted and function as already set forth but the rod 15 is made up of two telescoping elements 215 and 216 and maintained by a spring 185 in the elongated position in which they are locked by the thrust exerted by the collar 216' of the element 216 on the inner gradient 215' of the other. The element 216 carries the cross-piece 14 to which are secured the rods controlling the blades while 215 is secured to the piston 16.

To the piston 16, and, consequently, to the element 215 there is also secured a hollow axial rod 186 which, at its extremity, carries a piston 187 adjusting itself within a cylinder 188 located at the extremity of the element 216. Between the piston 187 and the fluid tight packing 189 integral with the element 216 and sliding on the rod 186, is provided a chamber 190, which communicates, via the apertures 191, and the cavity of the rod 186, with a tube 192 intended for the feed of liquid under pressure. When the liquid is idle within the chamber 190, the two elements 215, 216 occupy the extension position depicted, under the influence of the spring 185. When liquid under pressure is forced in, this liquid acts, through the tube 192, the hollow rod 186 and the apertures 191, so as to set up a pressure within the cylinder 188 and shifts the element 216 within the interior of 215 and over the rod 186, towards the piston 16 in such a way as to produce the displacement of the propeller blades while the piston 16 remains in the position assigned it by its control.

The relative displacement between the two elements 215, 216, may continue until the collar 216' abuts against the piston 16; under these conditions, the infinite pitch is obtained.

This arrangement may be combined with a system of pawls acting by centrifugal force and capable of pre-establishing another auxiliary pitch such as that for great altitudes. To effect this, there are pivotally mounted at 193 on the piston 187 the pawls 194 subjected to the influence of the return spring 195 and subject to the action of centrifugal force. If the displacement, just described, of the element 216 relatively to 215 takes place while the shaft 1 is at rest, the pawls 194, under the influence of the spring 195 retain, the position indicated in Fig. 28 and allow the element 216 to execute its complete travel relatively to 215.

If the shaft 1 is in rotation, the pawls 194 swing outwards under centrifugal force and are brought into engagement with the collar on the extremity 196 of the element 216 so as to stop the latter after a certain travel and thus maintain the pawls in the pitch position for high altitudes.

With the system just described it is possible, by means of a hand or self-acting speed governor, to control the admission of fluid through any one of two cooperating ports of the slide valve so as to effect the necessary throttling and the discharge through the chamber 50, so as to obtain between two extreme propulsion pitches an infinite series of intermediate pitches.

In the foregoing description, it has been assumed that the control means 37—88 are intended for a single engine only but it is obvious that they may act, simultaneously, on several engines.

The various control members, indicated diagrammatically by 110, 113, 106, may be of any appropriate type, such as, for instance, electromagnetic or pneumatic.

I claim:

1. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a two-way control system in said fluid pressure system, distributing valves on each way of the said control system for distributing the medium of the fluid pressure to the cylinder for moving the piston in one direction only, one way with moderate changing speed and the other way with fast changing speed, yieldable means for moving the piston in the opposite direction, stops for limiting the maximum displacement of the piston in said directions which correspond to two extreme predetermined pitches, means in the one way control system of moderate changing speed for establishing a condition of equilibrium between the action of the fluid medium under pressure and the action of the yieldable means at least in one predetermined intermediate position which corresponds to an intermediate predetermined propulsion pitch.

2. In a variable pitch propeller, a propeller shaft, a cylinder, propeller blades mounted on the shaft for rotation about the axes of the blades, a pitch changing means, means connecting the pitch changing means and the blades, a piston movable in the cylinder, yieldable means biasing the piston in one direction, means connected to the piston to actuate the pitch changing means, a fluid pressure system, a control system in said fluid pressure system, distributing valves for distributing the medium of the fluid pressure system to the cylinder for moving the piston in one direction only while yieldable means moves the piston in the opposite direction, a hollow slide valve in the control system coaxial with the cylinder connected to the piston and sliding into a sleeve fixed to the cylinder and rotating in a stationary support, said slide valve having ports at different axial positions, said sleeve having ports distributed along the sleeve so as to cooperate with the ports of the valve, and an adjustable distributor adapted to bring into operation one set of ports of the sleeve and of the valve in such a manner that the feed which takes place therethrough compels the slide valve to assume the position corresponding to that in which the reciprocal throttling of the two cooperating ports establishes a condition of equilibrium between the action of the yieldable means and the action of the fluid medium under pressure and a compensation of the fluid losses occurring in the system.

3. In a variable pitch propeller as claimed in claim 2, a slide valve provided with several ports of different lengths in the axial direction distributed around the slide valve and adapted to cooperate with a single port in the fixed sleeve for the feed of fluid pressure, and means for putting into action one port of the valve with a port of the sleeve to regulate the position to be taken by the member actuating the blades.

4. In a variable pitch propeller, a propeller shaft, a cylinder, propeller blades mounted on said shaft for rotation about the axes of the blades, pitch changing means, means connecting the pitch changing means and the blades, a piston movable in the cylinder, yieldable means biasing the piston in one direction, means connecting the piston to actuate the pitch changing means, a fluid pressure system, a control system in said fluid pressure system, distributing valves for distributing the medium of the fluid pressure system to the cylinder for moving the piston in one direction while the yieldable means moves the piston in the opposite direction, a sleeve secured to the cylinder, a hollow slide valve in the control system coaxial with the cylinder connected to the piston and sliding in said sleeve and rotating in a stationary support, said slide valve having ports at different axial positions, said sleeve having ports distributed therealong so as to cooperate with the ports of the valve, an adjustable distributor adapted to bring into operation one set of ports of the sleeve and of the valve in such a manner that the feed which takes place therethrough compels the slide valve to assume the position corresponding to that in which the reciprocal throttling of the two cooperating ports establishes a condition of equilibrium between the action of the yieldable means and the action of the fluid medium under pressure and a compensation of the fluid losses occurring in the system, and means for introducing into the cylinder a supplementary feed of fluid under pressure independently of the slide valve for the purpose of producing temporary variations in the pitch.

5. In a variable pitch propeller, a propeller shaft, a cylinder, propeller blades mounted on said shaft for rotation about the axes of the blades, pitch changing means, means connecting the pitch changing means and the blades, a piston movable in the cylinder, yieldable means biasing the piston in one direction, means connecting the piston to actuate the pitch changing means, a fluid pressure system, a control system in said fluid pressure system, distributing valves for distributing the medium of the fluid pressure system to the cylinder for moving the piston in one direction only while the yieldable means moves the piston in the opposite direction, a sleeve secured to the cylinder, a hollow slide valve in the control system coaxial with the cylinder connected to the piston and sliding in said sleeve and rotating in a stationary support, said slide valve having ports at different axial positions, said sleeve having ports distributed therealong so as to cooperate with the ports of the valve, an adjustable distributor adapted to bring into operation one set of ports of the sleeve and of the valve in such manner that the feed which takes place therethrough compels the slide valve to assume the position corresponding to that in which the reciprocal throttling of the two cooperating ports establishes a condition of equilibrium between the action of the yieldable means and the action of the fluid medium under pressure and a compensation of the fluid losses occurring in the system, and a cover secured in a movable manner to the cylinder for moving the slide valve.

6. In a variable pitch propeller, a propeller shaft, a cylinder, propeller blades mounted on said shaft for rotation about the axes of the blades, a pitch changing mechanism, means connecting the pitch changing mechanism and the blades, a piston movable in the cylinder, yieldable means biasing the piston in one direction, means connected to the piston to actuate the piston changing mechanism, a fluid pressure system, a control system with two ways one for moderate and the other for fast changing speed through which the fluid medium is brought to act into the cylinder under low and high pressure respectively, distributing valves in each way of said control system for distributing the medium of the fluid pressure to the cylinder for moving the piston in one direction while the yieldable means moves the piston in the opposite direction, means for carrying out the aerodynamic braking of an aeroplane to which the propeller is fitted by reversal of the pitch comprising control means for distributing through the fast changing speed way the fluid medium to the cylinder, a cooperating device which automatically controls the fuel feed to the engine which actuates the propeller for the purpose of automatically coordinating the working speed of the engine during the braking, and safety devices provided between the member actuating the brake and the member normally actuating the feed of fuel to the engine to prevent wrong manipulations.

7. In a variable pitch propeller as claimed in claim 6, a device operated by the fluid medium for controlling the feed of fuel to the engine during the braking, said device being expandable and contractible under the action of said fluid medium for controlling the fuel feed to the engine.

8. In a variable pitch propeller as claimed in claim 6, a control means for the distribution of the fluid medium at high pressure to the cylinder which controls the pitch changing mechanism, a valve, brake actuating means operating said valve when moved to one position, and a discharge valve controlled by the brake actuating means when it is moved to another position.

9. In a variable pitch propeller as claimed in claim 6, an automatic non-return valve in a conduit through which the fluid medium at high pressure is introduced into the cylinder during the braking operation.

10. In a variable pitch propeller as claimed in claim 6, means operated by the fluid medium at high pressure for the control of the discharge of said fluid medium from the cylinder.

11. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction only, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate predetermined pitch, a set of mechanical stop members subjected to the action of the centrifugal force for stopping in one direction when the medium of the fluid pressure system becomes inoperative, the movement of the member actuating the blades in an intermediate position corresponding to a long propulsion pitch, and means acting on said stop members in a direction opposite to the centrifugal force so that the stop members become inoperative when the propeller is stopped.

12. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction only, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate propulsion pitch, two sets of mechanical stop members subjected to the action of the centrifugal force for stopping in one direction when the medium of the fluid pressure system becomes inoperative, the movement of the member actuating the blades in two different positions which correspond to two different predetermined pitches, means acting on said stop members in a direction opposite to the centrifugal force so that the stop members become inoperative when the propeller is stopped, and means for positively actuating the one of said sets when the propeller is running.

13. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate predetermined propulsion pitch, means for introducing fluid into the cylinder when an engine driving the propeller is inoperative for the purpose of reversing the pitch and thus stopping rotation of the propeller due to the wind caused by flight, and means for discharging the fluid from the cylinder for moving the blades to an infinite pitch.

14. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate predetermined propulsion pitch, said means connected with the piston to actuate the pitch changing means including two telescoping elements capable of being expanded by spring means, a cylinder provided between said elements, and means for introducing fluid into the last mentioned cylinder for the purpose of modifying the length of said telescoping elements against the action of the spring means.

15. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate predetermined propulsion pitch, a collar connected to the means actuating the blades and in which one blade is secured, a lever for regulating the angular position of the blades with respect to the collar pivotally mounted at one end in a radial position on a face of the collar and engaging at its other end in a slot in the blade, and control bolts engaging the regulating lever.

16. In a variable pitch propeller, a propeller shaft, a cylinder, propeller blades mounted on said shaft for rotation about the axes of the blades, pitch changing means, means connecting the pitch changing means and the blades, a piston movable in the cylinder, means connected with the piston to actuate the pitch changing means, a fluid pressure system, a control system in said fluid pressure system, distributing valves for distributing the medium of the fluid pressure system to the cylinder for moving the piston in one direction, yieldable means for moving the piston in the opposite direction, stops for limiting the maximum displacement of the piston in said directions which correspond to two extreme predetermined pitches, means in the control system for establishing a condition of equilibrium between the action of the fluid medium under pressure and the action of the yieldable means at least in one predetermined intermediate position which corresponds to an intermediate predetermined propulsion pitch, said means connected to the piston to actuate the pitch changing means including a rod guided parallel to the axis of the propeller shaft and cooperating with a slider fixed on the rod, said slider having a seat therein, a member engaging said seat situated eccentrically relatively to the axis about which the blade is orientated and secured to the foot of the latter.

17. In a variable pitch propeller as claimed in claim 2, a member actuating the pitch-changing mechanism and a slide valve of open tubular form.

RAFFAELE MATTEUCCI.